Figure 1:
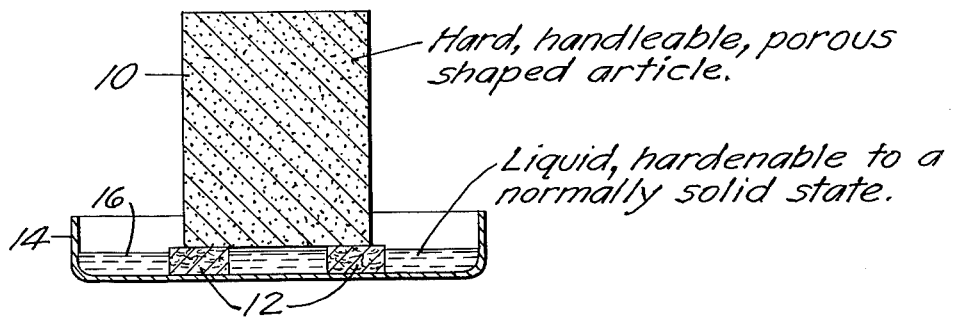

Oct. 2, 1962  G. A. ROTHWEILER ET AL  3,056,704
BONDING OF INERT PARTICLES
Filed Oct. 30, 1957

INVENTORS
GEORGE A. ROTHWEILER
GEORGE C. HARRISON
JAMES S. CASEMENT
BY
Carpenter, Abbott, Coulter & Kinney
ATTORNEYS though occasional reactive coating on such particles, or like modifications of the particles, may be desirable and are intended to be included within the scope of the invention.

3,056,704
BONDING OF INERT PARTICLES

George A. Rothweiler, St. Paul, George C. Harrison, Roseville, and James S. Casement, St. Paul, Minn., assignors to Minnesota Mining and Manufacturing Company, St. Paul, Minn., a corporation of Delaware
Filed Oct. 30, 1957, Ser. No. 693,238
9 Claims. (Cl. 154—2.6)

This application is a continuation-in-part of copending application Serial No. 570,623, filed March 9, 1956, now abandoned.

This invention relates to methods of bonding minute inert particulate matter and to moldable compositions incorporating such particulate matter and having utility for a variety of purposes, particularly in forming self-sustaining, porous, dried shapes which can then be impregnated with liquid materials capable of hardening to a dense resinous state. Of primary importance is the production of economical, hard, strong, heat-resistant, homogeneous and unusually durable resinous articles by means of impregnating such porous, dried shapes with liquid heat-curable resin and then curing the resin.

Comparatively recent advances in the quality of cured resinous materials have given rise to widespread efforts to adapt resins to uses for which they were previously believed to be unsuited. However, the manufacture of resinous castings requires a mold, which cannot normally be removed for a substantial period of time, that is, until the resin advances to a self-sustaining tack-free state. Where the resinous casting is of complex shape or includes critical dimensions, the mold can be costly, and since efficient production may require a large number of molds, the financial outlay can become substantial. While the use of heat to accelerate the hardening of the resin may speed production, it requires that the mold be designed to withstand repeated heating and cooling.

Whenever a material is hardened to a resinous state in a mold, a problem of mold release is encountered. In many cases, this simply involves coating the interior of the mold from time to time with a release agent, but on occasion, a resinous molding will fail to release properly and production is held up while the resin is laboriously cleaned out.

An additional difficulty besetting prior art methods for preparing cured resinous articles is the tendency of thermosetting resin compositions to advance in viscosity at ordinary room temperature, eventually becoming unusable. Their shelf life, or the time for which they can be satisfactorily stored, usually does not exceed a period of several hours or days. The use of resin compositions having short shelf life requires mixing by the ultimate consumer, which procedure involves waste of time and material as well as risk of poor quality in the cured products arising out of improper mixing. The use of one of the few resin compositions which can be stored without special precautions for substantial periods is not always feasible in view of desired properties and costs.

A novel process and novel compositions for carrying out such process have now been devised whereby the aforementioned difficulties in the manufacture of resinous articles may to a considerable degree to overcome. This procedure involves forming a self-sustaining wet shape at pressures roughly equivalent to moderate hand pressure using a moldable aggregate of minute inert particles coated with a binder in a volatile liquid vehicle, drying the shape to a hard, handleable, uniformly porous, crack-free state, saturating the dried shape with a heat-curable liquid resin composition which is substantially free from volatile solvent and in which the binder is substantially insoluble, and then curing said liquid resin composition to a dense resinous state. A large number of binders suitable for molding inert particles into relatively strong shapes are well known and are suitable for use in the practice of this invention. However, a specific class of binders is much superior to others and provides moldable aggregates having excellent molding properties, with which are obtained self-sustaining shapes of good strength. These shapes experience surprisingly little shrinkage on drying and, after drying, maintain their shape while being impregnated with wide varieties of hardenable liquid resin compositions over a wide range of temperatures.

This class of binders includes hydrophilic and at least partially water-soluble, and preferably completely water-soluble, polymers of acrylic compounds, such as polyacrylic acid, ammonium polyacrylate, polyacrylamide, and equivalent materials.

Since the novel compositions of this invention are moldable to self-sustaining shapes, a shape can be removed from the mold as soon as the moldable aggregate is packed into place, although for inherently fragile shapes, partial drying before removal may be in order. Since the shape is normally removed from the mold before the application of heat, the mold may be constructed of easily formed, low-cost materials such as wood. While release from the mold may in some cases be effected without special provision and in most cases be effected by painting the mold surfaces with a release agent, it has been found that superior results are achieved by incorporating the composition, which is coated on the inert particulate matter to provide a moldable aggregate, in an oil system, e.g., in a water-in-oil emulsion. However, since the moldable aggregates may be shaped by hand, a mold is not always required.

The moldable aggregate is conveniently packed into the mold, but it may be blown in, in which event the mold must be vented to guard against the formation of air pockets. The latter procedure is particularly convenient in the encapsulation of electrical components. In either procedure, vibratory or other compacting means may be used to assist in obtaining a dense shape.

As soon as the wet or green shape is removed from the mold, the shape may be dried in a short period in an oven or under a blast of hot air or, if the vehicle is volatile at room temperatures, in a longer period by standing at room temperatures. The time required for drying depends upon the volatility of the liquid vehicle and in part upon the characteristics of the inert particles. For example, when heated to the same temperature, shapes based on aluminum or steel powders dry more rapidly than do shapes based on siliceous matter.

A variety of suitable particulate materials are useful ingredients of the novel moldable aggregates. Among these are sand, glass beads, cullet, powdered iron, powdered stainless steel, pulverized taconite, silicon carbide, aluminum oxide, aluminum, decomposed silicate, diatomaceous earth, vermiculite, perlite, nylon flock, glass fibers, polystyrene beads and powdered resins such as cured phenolic resins. The choice of particulate material, of course, depends on the properties desired in the cured products. Powdered aluminum provides cured resinous articles exhibiting excellent heat transfer. Cured resin-impregnated shapes based on glass beads offer excellent electrical insulation. Hollow particles yield lightweight products. Because it is preferred that the moldable aggregate be storable for substantial periods of time, the particulate matter should be inert to other materials in the aggregate, When using hard, non-porous particulate matter such as sand, it is preferred that the average particle pass a 60 mesh screen, i.eg., have a diameter no larger than about 250 microns. Molded aggregates having larger average particle size produce shapes of rather poor green strength. The dried or baked shapes using the larger particles are impregnated somewhat less readily, and cured articles obtained by impregnation with a thermosetting resin are somewhat weaker than articles obtained using smaller particles. However, best results in point of ease of impregnation are obtained if the average particle size is no smaller than about 400 mesh (37 microns).

These ranges of preferred particle size do not apply to flexible porous particles. Their compressibility and capacity for absorbing binder allows compact shapes of good strength to be prepared even though the average particle size is far larger than 250 microns in diameter. Neither is minimum particle size of importance since impregnation does not depend upon voids between particles.

The proportion of binder in the moldable aggregate is preferably held to a minimum at which well bonded, handleable shapes may be obtained. A greater proportion of binder normally entails a corresponding increase in vehicle in order to hold the binder in solution. Such increase results among other things in greater shrinkage and a tendency for the shape to crack on drying. The preferred weight proportions of binder and vehicle depend on the specific gravity of the particulate matter and to a lesser extent on the size and angularity of the individual particles. When using washed, rounded silica sand averaging 100 mesh in a moldable aggregate employing water as the volatile vehicle, on the order of 1.5 percent water and one percent binder such as ammonium polyacrylate, based on the weight of the sand, enables the production of hard, handleable, crack-free, porous shapes. Using this composition, a slab measuring 38 by 28 inches and varying in thickness from 1¼ to 1¾ inches, when fully dried supports its own weight of eighty pounds with a substantial margin of safety. If the proportion of water is less than about one percent, the aggregate is not readily moldable and wet shapes formed therewith tend to collapse under their own weight. At about two percent or more of water, the shapes tend to crack on drying. Reduction in proportion of binder to about 0.5 percent by weight based on the rounded sand results in dried shapes which lack good handleability. More than about 1.5 percent ammonium polyacrylate in water cannot normally be used due to solubility problems—without raising the proportion of water to an undesirably high level as noted above. When using crushed sand particles of the same average size, about 25 percent more binder and water is preferred as compared to moldable aggregates based on rounded sand.

When preparing a moldable aggregate of porous particulate matter, one cannot determine the proper proportion of binder and vehicle merely from reference to formulae for rounded or crushed silica sand or other non-porous particles of known specific gravity. In such event, a sample of the particulate matter may be mixed with the volatile liquid vehicle until an aggregate is attained which holds its shape when fashioned with the finger and yet does not have a sticky feel. That is, chunks of the shape should not transfer to the fingers, even if the fingers are solvent-clean. After determining the proper proportion of vehicle, the moldable aggregate may be made up, normally using as much binder as will readily dissolve in the vehicle.

The dried, porous shapes are useful for purposes other than the production of resinous articles. Shapes prepared from moldable aggregates of aqueous solutions of acrylic polymers coated on glass beads, when used to cast certain metals, yield castings of unusually precise dimension and superior finish. A shape may be fashioned around an object to provide means for holding it while it is machined, after which the shape may be broken away or removed with a solvent for the binder. Articles having commercial utility may be produced by impregnating the dried porous shapes with liquids which can be hardened to a normally solid state and subsequently hardening the liquids, although the hardened liquid is not resinous.

However, this invention is primarily concerned with the production of resinous articles. A class of materials which cure to especially strong, tough, resinous products are epoxy resins such as are obtained from the reaction of epichlorhydrin and bisphenol or equivalent reactants. The epoxy resins are characterized in having an average of more than one epoxy group per average molecular weight, through which groups the resins may be cross-linked to essentially infusible, insoluble products. The epoxy resins are by themselves permanently thermoplastic and ordinarily require the addition of chemical hardening agents in order to be cured, some of which chemical hardening agents co-react with the resin and ordinarily are used in amounts approximately stoichiometrically equivalent thereto whereas others catalyze a reaction between the epoxy resin and a co-reactant and may be present in minute proportions.

Some compositions of epoxy resins and their chemical hardening agents are liquids of sufficiently low viscosity to impregnate the porous shapes, in the practice of this invention, at normal room temperatures. Other compositions may be solid or highly viscous at ordinary room temperatures and must be heated to attain a suitable viscosity. In either event, it is necessary that the composition remain fluid long enough to saturate a shape.

Some compositions harden to a resinous state before they can be converted to a homogeneous liquid and not only cannot be used to impregnate porous shapes in the practice of this invention, but homogeneous resinous castings cannot be obtained with such compositions by any technique heretofore known to the inventors. It has now been found that a composition of this type can be utilized in the manufacture of resinous articles by uniformly distributing the chemical hardening agent throughout the porous shape and using the resin-forming portion of the composition as the liquid impregnant for that shape. Using this technique, chemical hardening agents which were previously thought to be unsuitable as resin hardening agents in the production of uniform resinous castings are useful for this purpose. For example, melamine may be distributed throughout a porous shape by dispersing it in the moldable aggregate from which the shape is formed, and impregnation of the shape with epoxy resin produces upon curing a resinous article of remarkably good toughness, strength and resistance to distortion at high temperatures. Accordingly, shapes produced with melamine as the co-reactive hardening agent for epoxy resin are useful as molds in the injection and compression molding of rubber and thermoplastic materials. In such use, large numbers of articles of excellent surface finish and precise dimension have been produced with no evidence of deterioration or wear of the resinous tool. To the knowledge of the inventors, no resinous article produced in accordance with teachings of the prior art is capable of withstanding the temperatures and pressures encountered in such use.

In the production of resinous shapes using a composition which by itself is curable to a strong, tough, resinous state, it is generally preferable to incorporate the chemical hardening agent for such composition in the moldable aggregate rather than in the impregnating liquid, even if its inclusion in the impregnating liquid yields resinous products of high quality. By including the chemical hardening agent in the moldable aggregate, the impregnating composition may be stored indefinitely, and after being heated to lower its viscosity to attain rapid impregnation of the shape, the unabsorbed portion may be cooled and later reused without ill effect. To illustrate, tertiary amines which catalyze the hardening of compositions of epoxy resin and carboxylic acid anhydrides can either be incorporated into the resin-anhydride impregnating composition, in which case the composition must be freshly mixed by the consumer as it cannot be satisfactorily stored for more than several days, or can be blended into the moldable aggregate. Because tertiary amines are readily soluble in mixtures of epoxy resin and carboxylic acid anhydride, one would expect that they would be washed off the particulate matter and fail to initiate curing of the impregnating composition. However, resinous products of excellent quality are produced in this fashion, apparently by virtue of a bond between the tertiary amine and the binder for the inert particles.

Of particular interest as impregnating materials because of their low viscosities are mixtures of epoxy resin and the alkenyl succinic anhydrides, the latter being the reaction products of equimolar proportions of maleic anhydride and olefins. Among these anhydrides is the reaction product of maleic anhydride and the tetramer of propylene, i.e., tetrapropenyl succinic anhydride.

The use of moldable aggregates containing tertiary amines in conjunction with impregnating compositions of epoxy resin and alkenyl succinic anhydrides is particularly preferred in the encapsulation of electrical components because the low viscosity provides rapid impregnation, the impregnated shapes cure rapidly at moderately elevated temperatures, e.g., 2 hours at 120° C., the cured resin has excellent electrical insulating properties, and the cost of the resin-forming materials is relatively low. Since a cured shape may contain about 75 to 80 percent sand or other low cost particulate matter, the cost is unusually low for resinous insulation. By selecting as a binder for the sand a non-hygroscopic material, a shock-resistant, moisture-proof, electrically insulating capsule may be obtained.

Impregnation of a dry, porous shape with liquid materials may conveniently be accomplished by placing the shape in a shallow bath of the liquid, whereby the liquid is taken up by capillary action. However, when the shape incorporates a chemical hardening agent for a heat-curable resin, difficulty may be encountered in curing the portion of the shape below the resin line. Accordingly, it is preferred that porous blocks be used to support the shape, which blocks extend slightly above the resin line.

A number of other techniques are suitable for impregnating baked shapes and may be required where the shape is too tall to take up resin by capillary action to its full height. The shape may be impregnated by the continuous application of the liquid impregnant to an upper surface or by immersion in an evacuated atmosphere. The latter technique is particularly valuable in impregnating shapes used to encapsulate electrical components in that the resin is drawn into interstices in the electrical component into which the moldable aggregate cannot be packed.

Since the dry, porous shapes possess considerable strength, it may be desired to impregnate only the crust of a shape to protect its relatively frangible surface or to render the shape non-porous. This may be accomplished by painting the surface with a liquid impregnant or by submerging the shape in a bath of the impregnant to seal off an air pocket.

Figure 2:
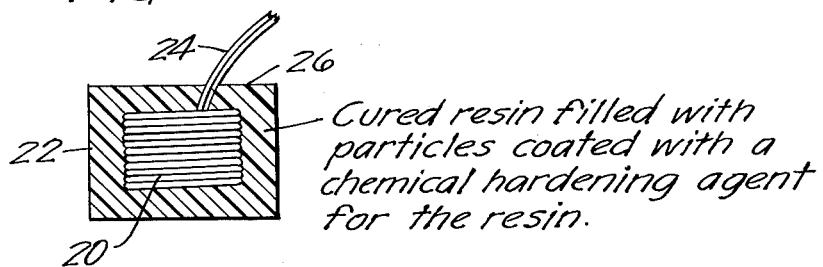

The novel methods by which resinous articles are produced in the practice of this invention may be best understood with reference to the drawings in which:

FIG. 1 is a front elevational view in section showing the capillary impregnation of a dried, porous, handleable shape in the practice of this invention, and FIG. 2 is a front elevation in section showing an electrical component encapsulated in a hard, electrically insulating, resinous shape.

Referring first to FIG. 1, a porous, shaped article 10 prepared from a moldable aggregate as taught by this invention is shown supported by small, porous blocks 12 standing in a pan 14. A heat-curable liquid resin composition 16 poured in the pan 14 to a depth less than the height of blocks 12 will be taken up into shaped article 10 through blocks 12 by means of capillary action to impregnate the shaped article 10 completely.

Shown in FIG. 2 is an electrical component 20 which has been encased in a resinous, moisture-proof, insulating capsule 22, which capsule consists of heat-cured resin filled with minute siliceous particulate matter to which a chemical hardening agent for said resin was bound prior to impregnation by means of a non-hydroscopic binder insoluble in said resin. Leads 24 extending through the surface 26 of the resinous capsule 22 are tightly sealed in that the coefficient of thermal expansion of the capsule 22 is in the order of that of metal by virtue of its large proportion of siliceous material.

The invention will now be further described in terms of a number of specific examples. Unless otherwise specified, formulas are given in parts by weight.

*Example I*

To one part of a 40 percent solution of ammonium polyacrylate in water, which solution had a viscosity of about 15,000 centipoises as measured at 23° C. with a Brookfield viscometer, was added one part of melamine, and stirring was continued for about 15 minutes until a homogeneous mixture was obtained. Four parts of this mixture were added slowly in a stream to one part of an 18 percent solution of stearic acid in mineral spirits with stirring. Stirring was continued for about 15 minutes after the addition of the acrylate-melamine mixture, resulting in a water-in-oil emulsion.

Ten pounds of glass beads having an average particle size of about 200 mesh were mulled together with 0.66 pound of this emulsion for 3 minutes in a power-driven muller to yield a moldable aggregate. Part of this aggregate was packed into a cylindrical mold two inches in diameter by means of a hand rammer to provide a green shape about four inches in height. The shape was immediately removed from the mold and dried in an oven for three hours at about 160° C.

A number of small porous supports were prepared following the above procedure except that the melamine was omitted from the moldable aggregate. These were placed in a flat pan to support the melamine-containing baked shape, and an epoxy resin was poured into the pan to a level just below the tops of the porous supports. The epoxy resin (Bakelite resin BR–18774, which designation is stated by the manufacturer to be changed to ERL–2774) is believed to be the reaction product of epichlorhydrin and bisphenol having a melting point of about 10° C. as determined by the Durrans' mercury method and an epoxide equivalent weight of about 200. The pan with the shape was then placed in an oven at about 150° C., and after 16 hours, the shape was completely impregnated and cured to a hard, dense state except at the end which contacted the porous supports, which end was somewhat soft. The softness was found to extend no more than 1/16 inch into the shape. The impregnated, cured shape had the following calculated composition:

| | Grams |
|---|---|
| Glass beads | 320 |
| Ammonium polyacrylate | 3.2 |
| Melamine | 8.0 |
| Epoxy resin | 80 |

The epoxy resin and melamine were present in approximately stoichiometrically equivalent amounts.

Cured resinous articles of various configurations according to the requirements of each particular test were prepared using the moldable aggregate and procedure described above. The following values were obtained:

Compressive strength, ASTM
 (D695) _____ 26,100 pounds per square inch.
Compressive strength at 150° C____ 7,000 pounds per square inch.
Tensile strength, ASTM
 (D638–52T) _____ 8,000 pounds per square inch.
Impact strength, ASTM (D256) ____ 2.1 ft. lb./in. of notch.
Heat distortion, 66 gram stress,
 ASTM (D648) _____ Greater than 215° C.
Hardness, Barcol tester (934–1) ____ 65.
Shrinkage on cure, linear _____ .0025 in./in.
Specific gravity _____ 1.86.

These values indicate that the cured shapes possess qualities of strength and toughness considerably in excess of those obtained from resinous castings using techniques of prior art.

A portion of the moldable aggregate was stored in an air-tight container for a period of several months, after which it was found to be substantially unchanged and capable, when molded and impregnated as above described, of producing cured resinous shapes equivalent in physical properties to those described above.

*Example II*

An emulsion of ammonium polyacrylate was prepared by dissolving 0.3 part of stearic acid in one part of mineral spirits and agitating this solution while adding in a small stream two parts of 40 percent aqueous ammonium polyacrylate.

One hundred parts by weight of glass beads averaging 140 mesh were mixed with 4.1 parts of this emulsion in a power-driven muller, and the resulting aggregate was packed into a mold to provide a green shape approximately four inches square by eight inches in length and having a sizable bowl-shaped depression. The mold was removed and the green shape was baked in an oven for one hour at 150° C. This baked shape was partially immersed for 24 hours at room temperature in a shallow bath of a mixture of 40 parts of the epoxy resin described in Example I, 60 parts of tetrapropenyl succinic anhydride, and 0.5 part of dimethylbenzyl amine. The whole was then placed in an oven at 125° C. for 15 hours, after which the molded shape appeared to be completely cured. The cured shape was sawed in half and found to be impregnated and cured throughout to a hard, strong mass.

The weight of the molded shape prior to resin impregnation was 601 grams as compared to 735 grams after impregnation.

*Example III*

One hundred grams of triethylamine were mixed with 450 grams of a 16 percent solution of polyacrylic acid in water, and a mixture of equal parts of ethyl alcohol and water was added to provide a solution containing 11 percent solids. One hundred grams of this solution were mulled with 1200 grams of washed, rounded silica sand averaging 100 mesh for about 5 minutes to provide a moldable sand mix which was packed to a height of two inches into a two-inch cylindrical mold, previously lubricated with mineral spirits to facilitate release. The mold was immediately removed, and the molded shape was baked at 150° C. for one hour and immersed while still warm to a depth of ½ inch in a mixture of 40 parts of the epoxy resin described in Example I and 60 parts of tetrapropenyl succinic anhydride. The baked shape appeared to be completely inmpregnated with the resinous composition after 3 to 4 minutes in the bath.

After impregnation, the bath with the shape was placed in an oven at 150 to 170° C. for about 2 hours, at which time the shape was cured completely to a hard, tough, resinous state as evidenced by its resistance at the cure temperature to scraping with a spatula and its ability to withstand heavy blows with a hammer without breaking.

Moldable aggregates, such as that of this example, employing a vehicle which readily volatizes when exposed to air at ambient temperatures sometimes lose their moldability before a shape can be prepared. To obviate the problem, a liquid vehicle which is substantially non-volatile until heated may be added or, if it is solvent for the binder, used to replace all or part of the more volatile liquid.

*Example IV*

One hundred sixty grams of a 33⅓ percent solution of polyacrylamide in water, which solution had a viscosity of about 2000 centipoises as measured at 23° C. with a Brookfield viscometer, were mulled with 160 grams of melamine and 3200 grams of atomized aluminum powder, which powder had passed a 60 mesh screen and was retained on a 400 mesh screen. After five minutes of mulling, the moldable aggregate was packed into a 2-inch diameter cylindrical mold to a height of four inches. The mold was then removed, and the resulting shape was dried at room temperature for seven hours and then placed in a shallow bath of the epoxy resin described in Example I. After 16 hours at 150° C., the shape was fully impregnated and had cured to a hard, strong state. The cured object comprised about 75 percent aluminum by weight.

Cured shapes prepared as described in this example take on a finish with polishing which cannot be distinguished from a polished piece of cast aluminum by visual examination. They are characterized in having unusually good thermal conductivity, much better than cured resinous articles filled with large percentages of aluminum particles and produced by techniques heretofore known to the inventors. Resinous molds for use in the injection or compression molding or rubber or thermoplastics can be prepared from aluminum-based shapes encasing hollow coils, through which molds liquid can be passed for purposes of transferring heat to or from the mold surfaces with remarkably good efficiency.

While the aggregate of this example has good moldability and produces handleable shapes which may be easily impregnated in the practice of this invention, it lacks the long term storability of the moldable aggregates of the preceding examples. Even when packed in an air-tight container, this aggregate becomes undesirably dry and crumbly after about two to four weeks storage and so does not lend itself to full commercial exploitation. However, when the water in the aggregate is replaced by ethylene glycol or glycerin or equivalent volatile liquid vehicle which dissolves the polyacrylamide binder in suitable proportion and towards which aluminum is inert, the resultant moldable aggregate is capable of storage for several months or years without loss in ability to provide self-sustaining shapes as required to practice this invention.

*Example V*

One hundred parts of a 25 percent solution of polyacrylamide in ethylene glycol, which solution had a viscosity of about 67,000 centipoises as measured at 23° C. with a Brookfield viscometer, were mulled with 91 parts of melamine and 4530 parts crushed steel powder, of which powder 99 percent had passed 100 mesh screen and 80 percent was retained on 325 mesh screen. Analysis of the steel powder showed, in addition to iron, percentages of ingredients as follows: 1.53 carbon, 0.27 silicon, 0.63 manganese, 0.006 sulfur, 0.019 phosphorous, 2.00 nickel and 0.26 molybdenum.

The mulled aggregate was packed into a 1-inch diameter cylindrical mold to a height of two inches. The shape, after removal of the mold was baked four hours at 150° C. and then placed in a shallow bath of the epoxy resin described in Example I. After 16 hours at 150° C., the shape was fully impregnated and had cured to a hard, strong state.

The cured shape was found to be a fair conductor of electricity, having a resistivity of approximately 235 ohm-centimeters. Its resistivity was about one-third that of an otherwise identical cured shape, save for the use of atomized steel powder, i. e., rounded particles, of the same average particle size as those of this example, i. e., atomized powder crushed to yield angular particles.

Cured shapes prepared from the moldable aggregate of this example and from moldable aggregates based on rounded steel particles are particularly useful as dies for use in forming sheet metals, e. g., cold-rolled sheet steel of 0.06 inch thickness. The surface of a die formed from steel powder in the practice of this invention has considerably less tendency to scratch or gall the metal being formed than do otherwise identical dies based on aluminum or siliceous particulate matter, and dies prepared following this invention have surprisingly good compressive strength whereby they are particularly suited to metal forming uses.

*Example VI*

A water-in-oil emulsion was prepared from 100 parts of a 40 percent solution of polyacrylamide in water, 100 parts of melamine, 18 parts of mineral spirits and 4 parts of a surfactant. Two hundred parts of hardwood sawdust obtained from a band saw were mixed with 480 parts of this emulsion and an additional 32 parts of water, and the mixture was mulled for 3 minutes in a power-driven muller. The moldable aggregate thus formed was packed tightly into a cylindrical mold 4 inches high and two inches in diameter using a ram and then forced out with the ram. The specimen expanded somewhat upon release from the mold. After baking for three hours at 105° C., the specimen was placed in an oven in a shallow pan of the epoxy resin of Example I. Impregnation was complete after 30 minutes at 160° C. Heating was continued for an additional 16 hours to insure complete cure.

The resin-impregnated shape was hard, light in weight and showed excellent strength and toughness. It was amenable to working in the same manner as wood, and when turned on a lathe, it developed a smooth, dimensionally-stable surface.

The term "inert" as it is applied to particulate matter in the presentation of this invention means that the particulate matter is insoluble in and non-reactive with the composition with which it is treated to provide a moldable aggregate and is also insoluble in and non-reactive with liquid material intended for impregnation of dried shapes fashioned from the moldable aggregate.

What is claimed is:

1. The method of sealing an electrical component in a resinous insulating capsule consisting essentially of the steps of (1) packing around the electrical component a moldable aggregate of minute particles each coated with a non-hygroscopic binder in a volatile liquid vehicle to provide a self-sustaining, component-containing wet shape, and where the particles are nonporous, the average particle size lying between 60 and 400 mesh, and where the nonporous particles are equivalent in specific gravity to sand, the aggregate including 0.4 to 2 parts binder and one to 8 parts volatile liquid vehicle per 100 parts by weight of particles, the proportions in any case being so selected that the aggregate is nonsticky and holds its shape when fashioned with the finger; (2) drying the shape to a hard, handleable, crack-free, uniformly porous state; (3) saturating the dried shape with a heat-curable liquid resin composition which is substantially free from volatile solvent and in which the binder is substantially insoluble; and (4) then curing said liquid resin composition to a dense resinous state, said particles being inert toward said binder, said vehicle and said liquid resin composition.

2. A method enabling the use of wooden molds and reuse of the molds within minutes in the manufacture of strong shaped resinous articles, said method consisting essentially of the steps of (1) molding to a self-sustaining wet shape under moderate pressure a moldable aggregate of minute particles each coated with a solution of a binder in a volatile liquid vehicle, and where the particles are nonporous, the average particle size lying between 60 and 400 mesh, and where the nonporous particles are equivalent in specific gravity to sand, the aggregate including 0.4 to 2 parts binder and one to 8 parts volatile liquid vehicle per 100 parts by weight of particles, the proportions in any case being so selected that the aggregate is nonsticky and holds its shape when fashioned with the finger; (2) drying the shape to a hard, handleable, crack-free, uniformly porous state; (3) saturating the dried shape with a heat-curable liquid resin composition which is substantially free from volatile solvent and in which the binder is substantially insoluble; and (4) then curing said liquid resin composition to a dense resinous state, said particles being inert toward said binder, said vehicle and said liquid resin composition.

3. A method enabling the use of wooden molds and reuse of the molds within minutes in the manufacture of strong shaped resinous articles, said method consisting essentially of the steps of (1) molding to a self-sustaining wet shape under moderate pressure a moldable aggregate of minute particles of sand each coated with a chemical hardening agent for epoxy resin and a solution in a volatile liquid vehicle of an acrylic polymer selected from the group consisting of polyacrylic acid, ammonium polyacrylate and polyacrylamide, said sand particles having an average particle size between 60 and 400 mesh, the aggregate including 0.5 to 2 parts acrylic polymer and one to 2.5 parts volatile liquid vehicle per 100 parts by weight of sand; (2) drying the shape to a hard, handleable, crack-free, uniformly porous state; (3) saturating the dried shape with a liquid epoxy resin which is substantially free from volatile solvent; and (4) then heating the resin-saturated shape to convert the resin to a dense resinous state.

4. A method enabling the use of wooden molds and reuse of the molds within minutes in the manufacture of strong shaped resinous articles, said method consisting essentially of the steps of (1) molding to a self-sustaining wet shape under moderate pressure a moldable aggregate of minute particles each coated with a solution of an acrylic polymer binder in a volatile liquid vehicle, and where the particles are nonporous, the average particle size lying between 60 and 400 mesh, and where the nonporous particles are equivalent in specific gravity to sand, the aggregate including 0.4 to 2 parts binder and one to 8 parts volatile liquid vehicle per 100 parts by weight of particles, the proportions in any case being so selected that the aggregate is nonsticky and holds its shape when fashioned with the finger; (2) drying the shape to a hard, handleable, crack-free, uniformly porous state; (3) saturating the dried shape with a liquid epoxy resin which is substantially free from volatile solvent and in which the binder is substantially insoluble; and (4) then heating the resin-saturated shape to convert the resin to a dense resinous state, said particles being inert toward said binder, said vehicle and said liquid epoxy resin.

5. A method enabling the use of wooden molds and reuse of the molds within minutes in the manufacture of strong shaped resinous articles, said method consisting essentially of the steps of (1) molding to a self-sustaining wet shape under moderate pressure a moldable aggregate of minute particles each coated with a chemical hardening agent for epoxy resin and a solution of a binder in a volatile liquid vehicle, and where the particles are nonporous, the average particle size lying between 60 and 400 mesh, and where the nonporous particles are equivalent in specific gravity to sand, the aggregate including 0.4 to 2 parts binder and one to 8 parts volatile liquid vehicle per 100 parts by weight of particles, the proportions in any case being so selected that the aggregate is nonsticky and holds its shape when fashioned with the finger; (2) drying the shape to a hard, handleable, crack-free, uniformly porous state; (3) saturating the dried shape with a liquid epoxy resin which is substantially free from volatile solvent and in which the binder is substantially insoluble; and (4) then heating the resin-saturated shape to convert the resin to a dense resinous state, said particles being inert toward said binder, said vehicle and said liquid resin composition.

6. A method as defined in claim 5 wherein the chemical hardening agent for epoxy resin is melamine.

7. A method as defined in claim 5 wherein the binder is polyacrylic acid and the chemical hardening agent is a tertiary amine.

8. A method enabling the use of wooden molds and reuse of the molds within minutes in the manufacture of strong shaped resinous articles, said method consisting essentially of the steps of (1) molding to a self-sustaining wet shape under moderate pressure a moldable aggregate of minute metal particles each coated with a solution in ethylene glycol of an acrylic polymer which is approximately as hydrophilic and water-soluble as polyacrylamide, said particles having an average particle size between 60 and 400 mesh, and where the metal particles are equivalent in specific gravity to sand, the aggregate including 0.4 to 2 parts binder and one to 8 parts volatile liquid vehicle per 100 parts by weight of particles, the proportions in any case being so selected that the aggregate is nonsticky and holds its shape when fashioned with the finger; (2) drying the shape to a hard, handleable, crack-free, uniformly porous state; (3) saturating the dried shape with a heat-curable liquid resin composition which is substantially free from volatile solvent and in which the binder is substantially insoluble; and (4) then curing said liquid resin composition to a dense resinous state, said particles being inert toward said binder, said volatile vehicle and said liquid resin composition.

9. A method enabling the use of wooden molds and reuse of the molds within minutes in the manufacture of strong shaped resinous articles, said method consisting essentially of the steps of (1) dispersing in a volatile oil system a solution of an acrylic polymer, which is approximately as hydrophilic and water-soluble as polyacrylamide, to provide a homogeneous liquid composition; (2) coating minute particles with said composition and with a chemical hardening agent for epoxy resin to provide a moldable aggregate, said particles being inert toward said solution and epoxy resin; and where the particles are nonporous, the average particle size lying between 60 and 400 mesh; and where the nonporous particles are equivalent in specific gravity to sand, the aggregate including 0.4 to 2 parts acrylic polymer and one to 8 parts volatile liquid per 100 parts by weight of particles; the proportions in any case being so selected that the aggregate is nonsticky and holds its shape when fashioned with the fingers; (3) molding said moldable aggregate under moderate pressure to provide a self-sustaining wet shape; (4) drying the shape to a hard, handleable, crack-free, uniformly porous state; (5) saturating the dried shape with a liquid epoxy resin which is substantially free from volatile solvent and in which the acrylic polymer binder is substantially insoluble; and (6) then heating the resin-saturated shape to convert the resin to a dense resinous state.

References Cited in the file of this patent

UNITED STATES PATENTS

| | | |
|---|---|---|
| 1,785,102 | Walker et al. | Dec. 16, 1930 |
| 1,947,085 | Hill et al. | Feb. 13, 1934 |
| 2,208,232 | Smolak | July 16, 1940 |
| 2,492,488 | Kremer | Dec. 27, 1949 |
| 2,574,168 | Brick | Nov. 6, 1951 |
| 2,657,153 | Russell | Oct. 27, 1953 |
| 2,683,674 | Hatcher et al. | July 13, 1954 |
| 2,765,507 | Wolf et al. | Oct. 9, 1956 |
| 2,788,297 | Louis | Apr. 9, 1957 |
| 2,806,509 | Bozzacco et al. | Sept. 17, 1957 |
| 2,829,982 | Hoyt | Apr. 8, 1958 |
| 2,871,204 | Hopkins | Jan. 27, 1959 |

OTHER REFERENCES

Modern Plastic, October 1952, pages 89–94.